(12) United States Patent
Betz et al.

(10) Patent No.: US 8,307,129 B2
(45) Date of Patent: Nov. 6, 2012

(54) METHODS AND COMPUTER PROGRAM PRODUCTS FOR SWAPPING SYNCHRONOUS REPLICATION SECONDARIES FROM A SUBCHANNEL SET OTHER THAN ZERO TO SUBCHANNEL SET ZERO USING DYNAMIC I/O

(75) Inventors: John F. Betz, Red Hook, NY (US); Harry M. Yudenfriend, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 645 days.

(21) Appl. No.: 12/013,659

(22) Filed: Jan. 14, 2008

(65) Prior Publication Data

US 2009/0182996 A1  Jul. 16, 2009

(51) Int. Cl.
*G06F 3/00* (2006.01)
*G06F 11/00* (2006.01)

(52) U.S. Cl. .......... 710/8; 710/2; 710/15; 710/17; 714/1; 714/4.2; 714/4.3

(58) Field of Classification Search .............. 710/8
See application file for complete search history.

(56) References Cited

U.S. PATENT DOCUMENTS

| | | | |
|---|---|---|---|
| 4,489,379 A | 12/1984 | Lanier et al. | |
| 5,504,861 A | 4/1996 | Crockett et al. | |
| 6,240,467 B1 | 5/2001 | Beardsley et al. | |
| 6,304,980 B1 | 10/2001 | Beardsley et al. | |
| 6,499,112 B1 | 12/2002 | Milillo et al. | |
| 6,973,586 B2 | 12/2005 | Petersen et al. | |
| 7,039,120 B1 | 5/2006 | Thoumy et al. | |
| 7,043,665 B2 | 5/2006 | Kern et al. | |
| 7,058,731 B2 | 6/2006 | Kodama | |
| 7,065,623 B2 | 6/2006 | Chen et al. | |
| 7,085,956 B2 * | 8/2006 | Petersen et al. | 714/6 |
| 7,366,853 B2 | 4/2008 | Honda et al. | |

(Continued)

FOREIGN PATENT DOCUMENTS

WO   02096035 A1   11/2002

OTHER PUBLICATIONS

Bill et al, IBM System z9 1009 Technical Introduction, Jul. 2005, IBM Redbooks, pp. ix, vi, 30-33.*

(Continued)

*Primary Examiner* — Henry Tsai
*Assistant Examiner* — Dean Phan
(74) *Attorney, Agent, or Firm* — Cantor Colburn LLP; William A. Kinnaman, Jr.

(57) ABSTRACT

Exemplary embodiments relate to a method for swapping PPRC secondary device definitions from a subchannel set other than zero to subchannel set zero. The method comprises identifying a PPRC primary and secondary device, wherein the PPRC primary device definitions reside at subchannel set zero and the PPRC secondary device definitions reside at a subchannel set other than subchannel set zero, initiating a PPRC device definition substitution operation to substitute the PPRC primary device definitions within the subchannel set where the PPRC secondary device definition resides and substitute the PPRC secondary device definitions within the subchannel set where the PPRC primary device definitions resides, storing the control block information for each PPRC device whose device definitions are to be substituted, and storing the PPRC primary device definitions within the subchannel set where the PPRC secondary device definition resides and storing the PPRC secondary device definitions within subchannel set zero.

10 Claims, 6 Drawing Sheets

U.S. PATENT DOCUMENTS

| | | |
|---|---|---|
| 2003/0002492 A1 | 1/2003 | Gallagher et al. |
| 2003/0056142 A1 | 3/2003 | Hashemi |
| 2003/0204772 A1 | 10/2003 | Petersen et al. |
| 2003/0204773 A1 | 10/2003 | Petersen et al. |
| 2004/0090912 A1* | 5/2004 | Loo .............................. 370/217 |
| 2004/0246931 A1 | 12/2004 | Thubert et al. |
| 2004/0260899 A1 | 12/2004 | Kern et al. |
| 2005/0005063 A1 | 1/2005 | Liu et al. |
| 2005/0081091 A1 | 4/2005 | Bartfai et al. |
| 2005/0114358 A1 | 5/2005 | Chen et al. |
| 2005/0114566 A1 | 5/2005 | Chen et al. |
| 2005/0114740 A1 | 5/2005 | Carberry et al. |
| 2005/0144521 A1 | 6/2005 | Werner |
| 2005/0154846 A1 | 7/2005 | Chen et al. |
| 2005/0268054 A1 | 12/2005 | Werner et al. |
| 2006/0075154 A1 | 4/2006 | Carlson et al. |
| 2006/0167100 A1 | 7/2006 | Wuthrich et al. |
| 2006/0179170 A1 | 8/2006 | Kodama |
| 2007/0050538 A1 | 3/2007 | Northcutt et al. |
| 2007/0157002 A1 | 7/2007 | Zelikov et al. |
| 2008/0005146 A1 | 1/2008 | Kubo et al. |
| 2008/0104443 A1 | 5/2008 | Akutsu et al. |
| 2009/0094403 A1 | 4/2009 | Nakagawa et al. |
| 2009/0259818 A1 | 10/2009 | Mogi et al. |
| 2009/0265584 A1 | 10/2009 | Kawakami et al. |

OTHER PUBLICATIONS

Joshua et al, Java Buzzlers: traps, Pitfalls, and Corner Cases, Jun. 2005, Addison-Wesley Professional, pp. vii, 11.*

IBM, "Bad Response to Establish Pathing Control Frame in Peer-toPeer Remote Copy Function," Technical Disclosure, IP.com, Dec. 1, 1995, http://www.ip.com/pubview/IPCOM000117123D.

IBM, "Compatibility Mode for the Establishment of Peer to Peer Remote Copy Paths," Technical Disclosure, IP.com, Jan. 26, 2005, http://www.ip..com/pubview/IPCOM000035614D.

IBM, "Management of Peer-to-Peer Control Unit Paths," Technical Disclosure, IP.com, Sep. 1, 1995, http://www.ip.com/pubview/IPCOM000116373D.

IBM, "Single Subsystem PPRC Copy," Technical Disclosure, IP.com, Feb. 1, 1999, http://www.ip.com/pubview/IPCOM000123629D.

Bill Ogden, "IBM System z9 109 Technical Introduction," Jul. 26, 2005, p. 1-6.

Sun Microsystems, "StorageTek Shared Wirtual Array (SVA)," 2006, pp. 48-49.

* cited by examiner

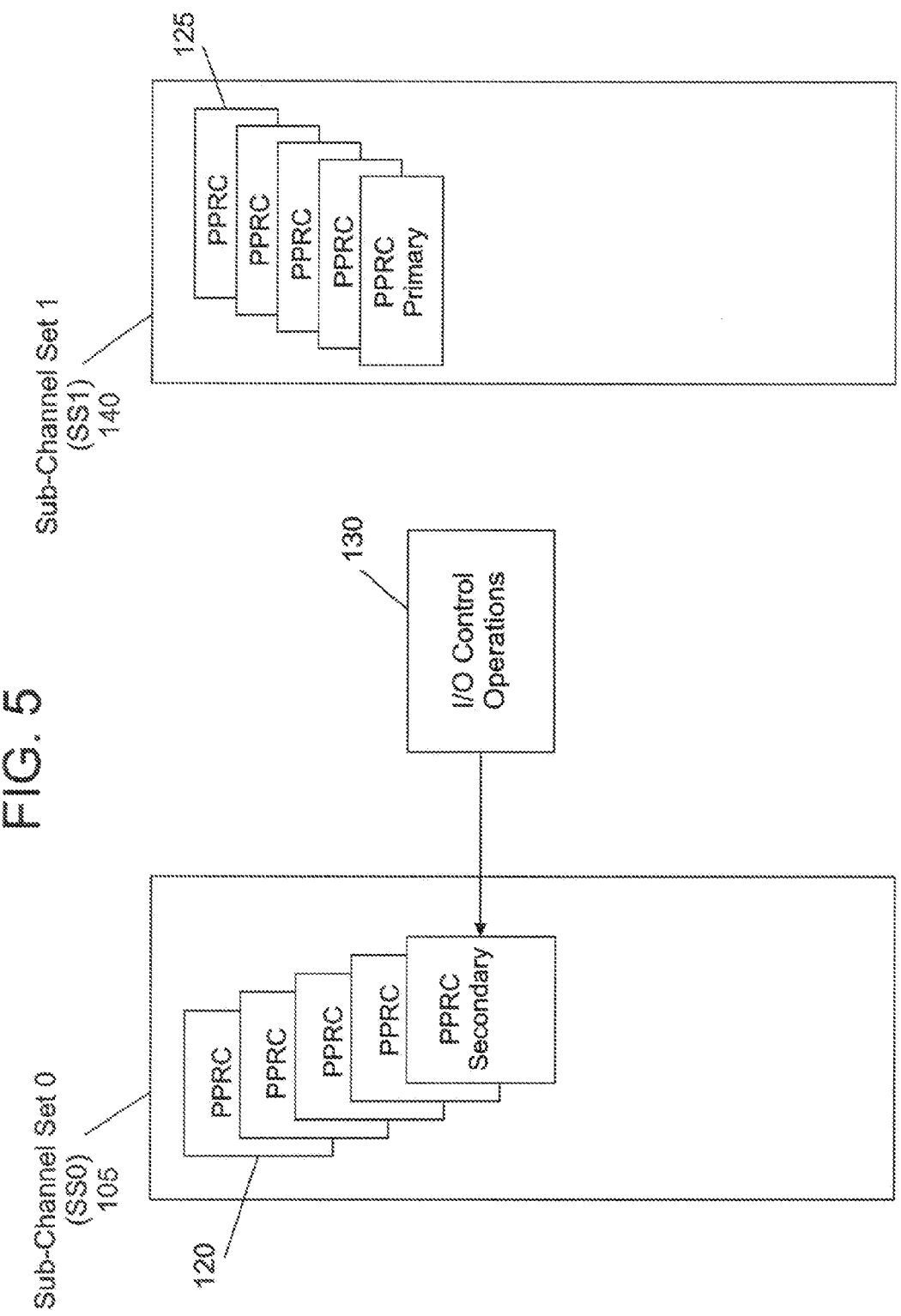

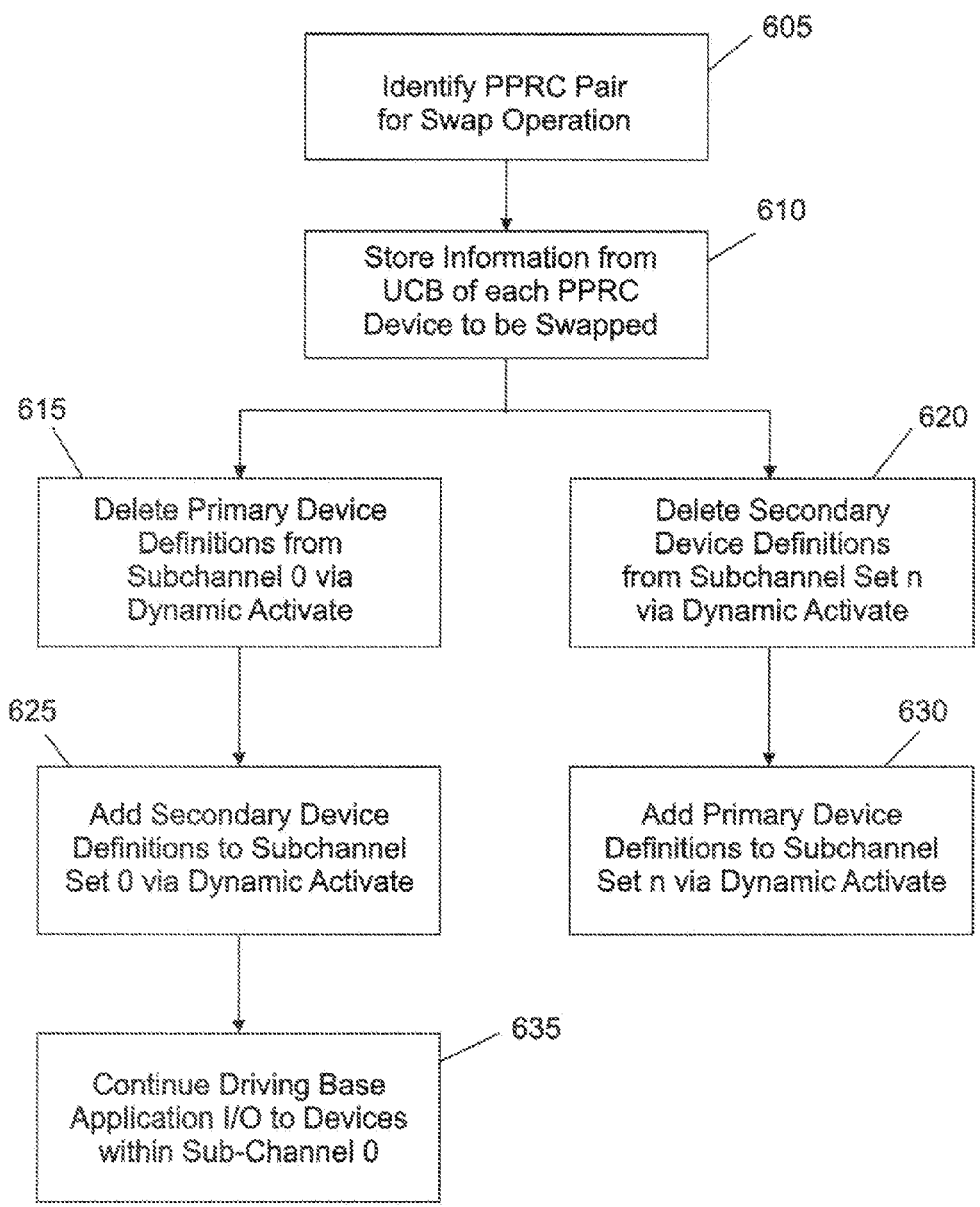

METHODS AND COMPUTER PROGRAM PRODUCTS FOR SWAPPING SYNCHRONOUS REPLICATION SECONDARIES FROM A SUBCHANNEL SET OTHER THAN ZERO TO SUBCHANNEL SET ZERO USING DYNAMIC I/O

CROSS-REFERENCE TO RELATED APPLICATIONS AND PATENTS

Reference is made to the following applications, U.S. patent application Ser. No. 12/019,917, entitled "Methods and Computer Program Products for Defining Synchronous Replication Devices in a Subchannel Set other than Zero," filed Jan. 25, 2008, now U.S. Pat. No. 7,761,610.

Reference is also made to U.S. Pat. No. 6,973,586, entitled "System and Method for Automatic Dynamic Address Switching," filed Apr. 29, 2002, and U.S. Pat. No. 7,085,956, entitled "System and Method for Concurrent Logical Device Swapping," filed Apr. 29, 2002. The above-referenced patent application and issued patents are assigned to the same assignee as this application. International Business Machines Corporation of Armonk, N.Y. Each of the listed application and patents is hereby incorporated herein by reference in its entirety:

BACKGROUND OF THE INVENTION

1. Field of the Invention

This invention relates to channel input/output (I/O) operations, and particularly to the defining of synchronous replication devices within subchannel sets other than subchannel set zero.

2. Description of Background

Channel I/O broadly refers to any I/O architecture that is employed within a computing architecture environment. Generally, channel I/O is implemented by the use of a plurality of dedicated I/O controllers—or processors—working in conjunction with a CPU in order to ensure the efficient transfer of data within a computing system environment. As such, the I/O controller is supplied with enough onboard logic and memory to autonomously handle a CPU's I/O task processing request.

In operation, the CPU will deliver channel programs to an I/O controller, the channel programs providing the I/O controller with the capability to complete any desired I/O task that is necessitated within the system without the burdening the CPU with the performance of the I/O processing task. Upon the completion of the I/O task, or in the event of an error, the I/O controller will communicate the status of the task to the CPU by way of an interrupt.

In configuration, a channel is an independent hardware component that is implemented to coordinate I/O to a predefined set of devices or controllers. Since a channel may support one or more devices or controllers, the channel programs that are associated with a channel will comprise the commands that the channel is responsive to in addition to the commands for the various devices and controllers to which the channel may be associated. Thus, an operating system has only to assemble the I/O commands for a respective channel program and thereafter execute a single I/O machine instruction to initiate the channel program; wherein thereafter the channel will take responsibility of the I/O task until the completion of the task.

Often implemented in conjunction with channel I/O operations, peer-to-peer remote copy (PPRC) describes a protocol that is implemented in order to mirror a primary storage volume to the same or different control unit that is associated with a secondary storage volume. As such, the utilization of synchronous PPRC causes each write operation to the primary storage to be performed at the secondary storage volume as well. The respective definitions of primary and secondary storage volumes each consume a device address within the addressable device space. The secondary storage volume device address is not addressable by application programs and, therefore, its device address reduces the total device addressability for application programs.

SUMMARY OF THE INVENTION

The shortcomings of the prior art are overcome and additional advantages are provided through the provision of a method for defining and accessing peer-to-peer remote copy secondary devices within a subchannel set other than subchannel set zero while maintaining transparency to application I/O requests. The method comprises identifying a PPRC pairing, the PPRC pairing comprising a set of PPRC primary device definitions and a set of PPRC secondary device definitions that are associated with the primary device definitions, the PPRC pairing being assigned to a subchannel set zero, and designating within an operating system that the device definitions of the PPRC secondary device can be assigned to a predetermined subchannel set that is selected from subchannel sets other than subchannel set zero. This provides the data replication of PPRC while eliminating the device addressability requirements of secondary devices in subchannel set zero, thus increasing the total data addressability of the system. Further, devices that are defined in a subchannel set other than zero are not directly useable by applications. Only when the subchannels representing the primary and secondary devices are swapped are the devices directly utilized by applications.

The method also comprises associating the PPRC secondary device with the predetermined subchannel set, associating I/O that is associated with the PPRC secondary device with a parameter value, wherein the parameter value serves as an indicator of the subchannel set to which the PPRC secondary device is associated, and executing an I/O request at the PPRC secondary device utilizing the predetermined subchannel set designation.

Computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

This demonstrates that this definition frees additional device numbers in SS0 that can now be accessed by application I/O programs.

Figure 3:
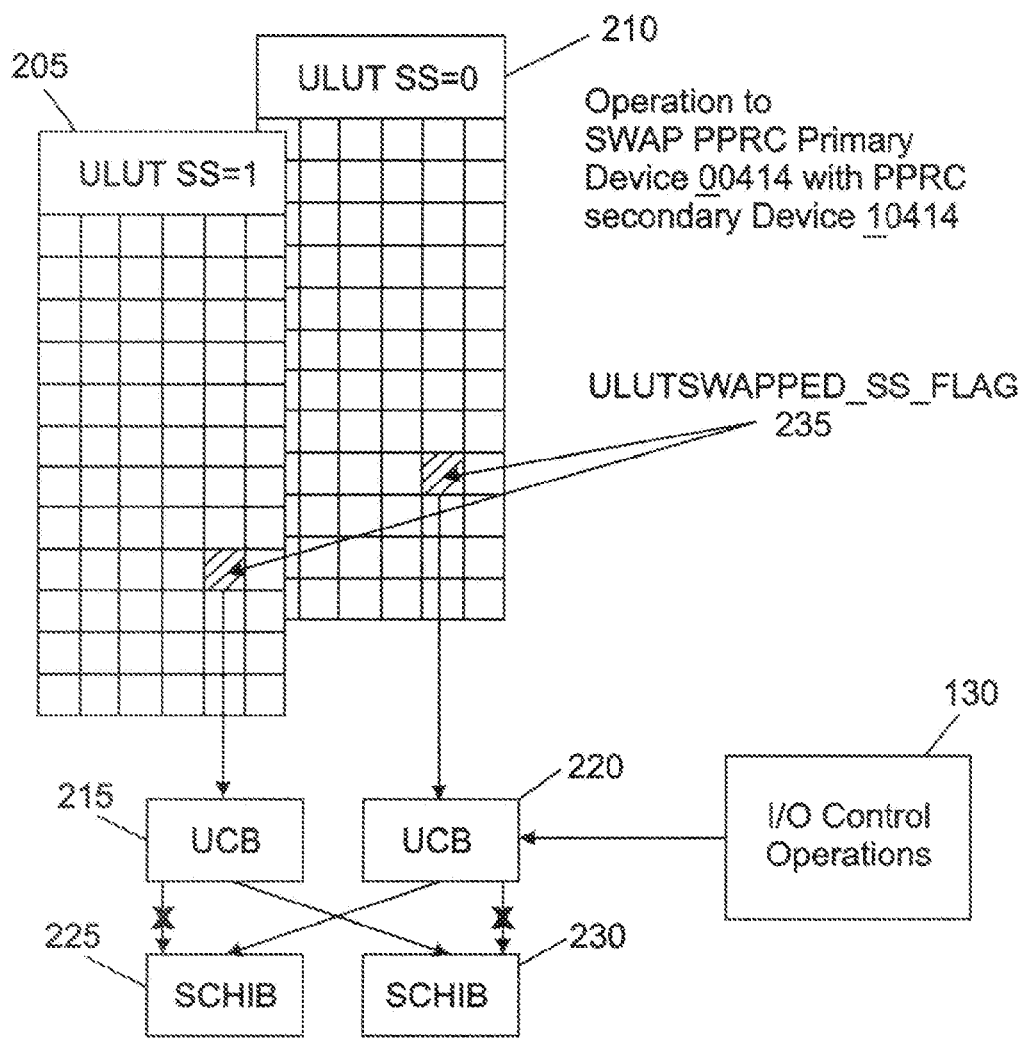

FIG. 3 illustrates one example of a PPRC primary device and PPRC secondary device swapping operation implemented in accordance with exemplary embodiments of the present invention.

Figure 4:
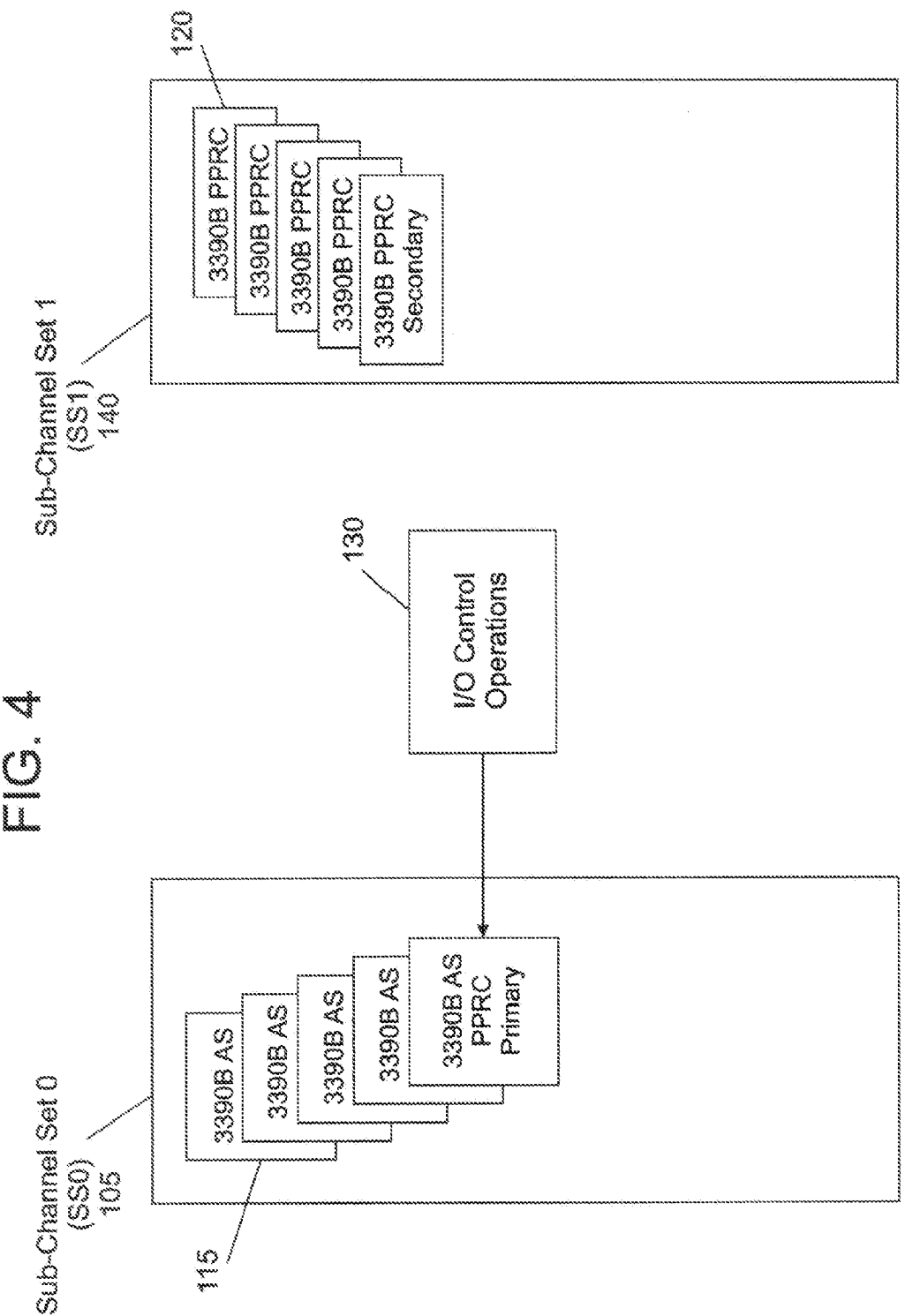

FIGS. 4 and 5 illustrate an example dynamic I/O PPRC primary device and PPRC secondary device reconfiguration in accordance with exemplary embodiments of the present invention.

FIG. 6 shows a flow diagram illustrating an exemplary method for swapping peer-to-peer remote copy devices in accordance with exemplary embodiments of the present invention.

The detailed description explains the preferred embodiments of the invention, together with advantages and features, by way of example with reference to the drawings.

DETAILED DESCRIPTION OF THE INVENTION

One or more exemplary embodiments of the invention are described below in detail. The disclosed embodiments are intended to be illustrative only since numerous modifications and variations therein will be apparent to those of ordinary skill in the art.

PPRC is a conventional synchronous replication technology that is known. All subsequent references to synchronous replication within the exemplary embodiments of the present invention are made in reference to the utilization of PPRC operations. Within the IBM server System z9 system architecture and in the z/OS operating system there is a 65,536 device number limit in the subchannel set zero. Subchannels within the subchannel set zero and the z/OS operating system are provided with a maximum of 65,536 device numbers that are useable by applications.

Exemplary embodiments of the present invention relate to a methodology for relieving the device number constraints within any operating system by exploiting predefined subchannel sets other than zero by defining PPRC secondary devices within subchannel sets other than zero. As such, exemplary embodiments of the present invention provide device number constraint relief by allowing PPRC secondary device definitions that were only allowed to be defined within subchannel set zero, to now be defined in any subchannel set other than zero. Thus, for n paired devices, this will provide n/2 additional device numbers and subchannels within subchannel set zero.

Currently, the management of device numbers and subchannels featured within the various subchannel sets is restricted to an I/O supervisor component of an operating system (OS). This restriction is not the result of a hardware or microcode restriction but rather a restriction that is implemented within the OS itself. The reason for the implementation of such a restriction is to avoid the myriad code changes that would be required for the manipulation of the many I/O control blocks that are required to be accessed during the course of any application required I/O as well as providing the capability to differentiate between duplicate device numbers that may exist in differing subchannel sets.

Generally, only the aliases of base parallel access volumes (PAVs) are accessible from a subchannel set other than subchannel set zero—this being subchannel set one. The aliases that reside within subchannel set one can operate without changing any I/O related application control blocks since the aliases are performing on behalf of a base device that still resides within subchannel set zero; thus, there is no need to change any associated application control blocks in order to complete an I/O task.

While the assignment of aliases to subchannel set one provides significant relief for systems that need to implement additional base devices, additional relief is still needed due to the continued growth in the number of base device numbers that are being employed to support a need for additional data within computing system environments. In many instances PPRC is implemented to replicate important system data in ease of catastrophic failure within the primary subsystem. However, PPRC utilizes a device number for each primary device and secondary device that is comprised within a PPRC device pairing.

In operation, PPRC secondary devices are offline to the OS. Further, no application I/O is allowed to access a PPRC secondary device. Within PPRC, the secondary device is kept in sync with the primary device via I/O that is managed exclusively by an I/O control unit. However, the OS manages the settings of the I/O control unit in order to establish, interrogate, and disband PPRC device pairs.

As mentioned above, only the aliases of a PPRC primary device are accessible by application I/O from a subchannel set other than subchannel set zero—this subchannel set presently being subchannel set one. Further, the present methodology of having a PPRC primary device definition and PPRC secondary device definition reside within the same subchannel set (subchannel set zero) places undue constraints on the number of base devices that may be implemented within a computing system environment. As such, exemplary embodiments of the present invention provide a solution for all paired PPRC devices allowing secondary PPRC device definitions in a subchannel set other than zero (e.g., subchannel sets one, two, three, etc.); wherein for n paired devices n, an additional n/2 device numbers and subchannels within subchannel set zero are provided.

However, since only the OS I/O supervisor component can access any secondary PPRC devices, in the event of a failure at the control unit of the PPRC primary device, exemplary embodiments of the present invention also provide a solution that will enable application I/O to be accessible to the PPRC secondary devices and device definitions that reside in subchannels sets other than zero.

Figure 1:
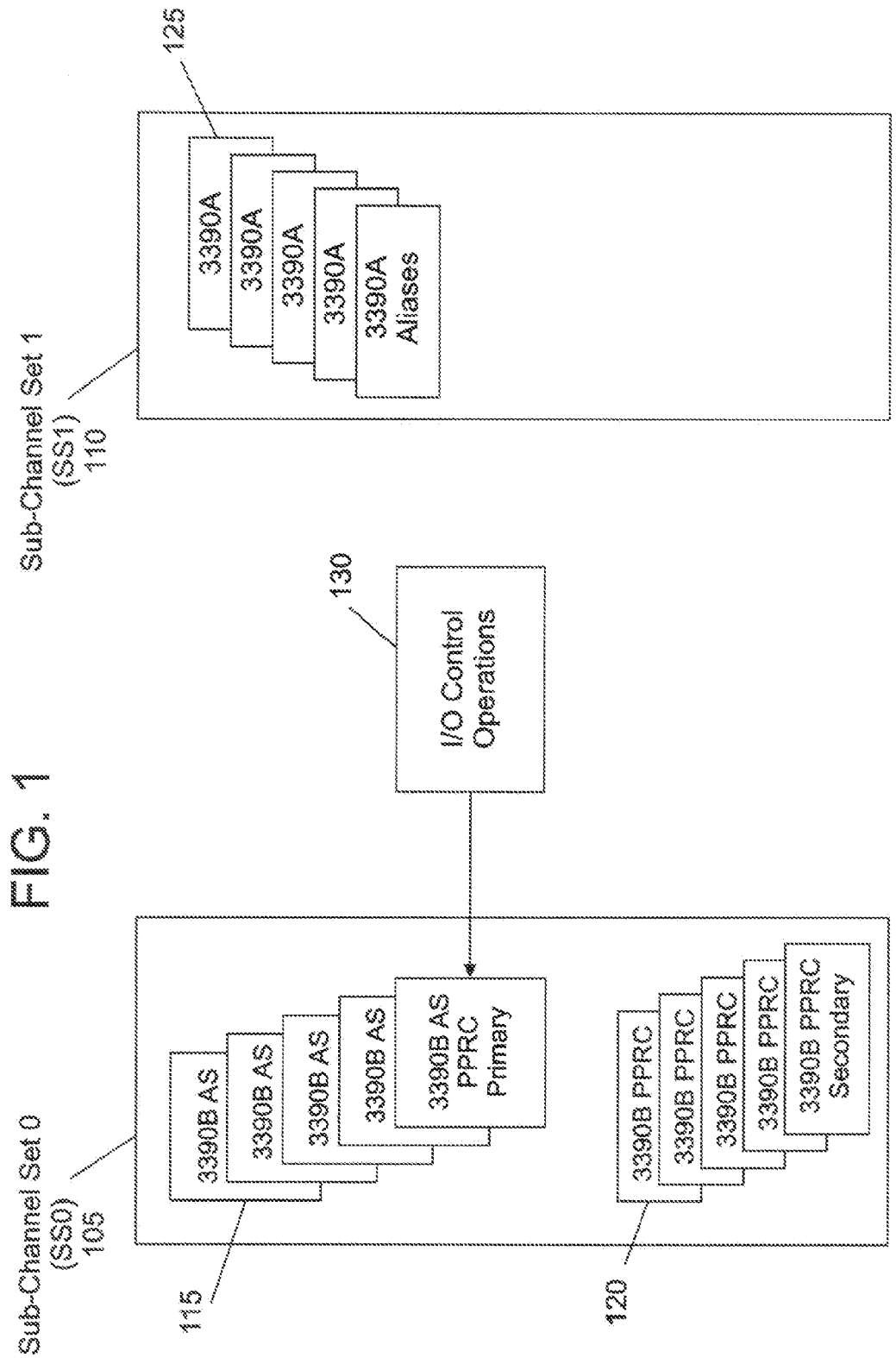
FIG. 1 illustrates one example of the device definitions of both primary and secondary PPRC devices as bases in SS0 while parallel access volumes (PAVs) are defined in SS1.

An exemplary embodiment of the present invention comprises defining PPRC secondary device definitions in a subchannel set other than subchannel set zero. This aspect is useful in providing space within subchannel set zero wherein additional devices numbers may be associated with subchannel set zero. FIG. 1 is a diagram illustrating a subchannel set zero (SS0) 105, wherein the SS0 105 comprises a set of PPRC primary device definitions 115 and a set of PPRC secondary device definitions 120. Further illustrated is a subchannel set one (SS1) 110, wherein SS1 110 comprises a set of PAV aliases that are associated with the PPRC primary device definitions 115 that currently reside within SS0 105. A set of I/O control operations 130 that are required for performing I/O request operations utilizing the PPRC primary device definitions 115 are also shown.

Figure 2:
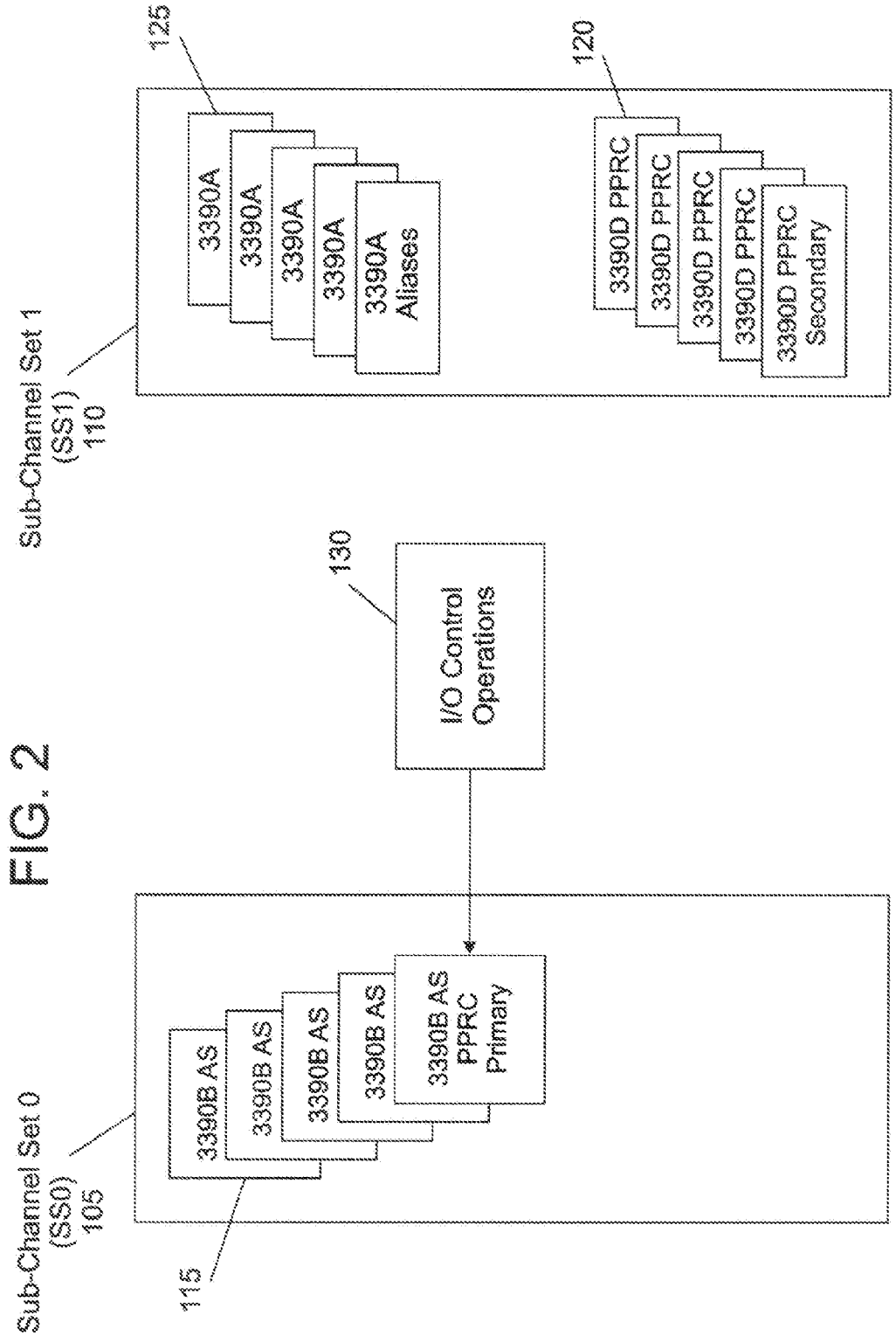
FIG. 2 illustrates one example showing the 3390B PPRC secondary device definitions (originally shown in FIG. 1) are now redefined as 3390D in SS1 though they could be defined to any subchannel set that is supported by the z/Architecture.

As shown in FIG. 2, by use of a device definition operation, the PPRC secondary device definitions 120 are now defined in SS1 110 and no longer defined in SS0 105 (within exemplary embodiments any subchannel set other than zero can be implemented). To differentiate between the duplicate PPRC device numbers that will reside within the two subchannel sets SS0 105 and SS1 110, the PPRC secondary devices are designated within the OS as having the capability to be assigned to SS1 110. Thus, the operating system code that interrogates and manages the PPRC device pairing would maintain this designation within its control block representations of the PPRC device pairing. Thereafter, any device specific I/O that needed to be directed to the PPRC secondary device would pass a parameter indicating that the PPRC device number was in SS1 110 thus allowing the I/O supervisor to initiate the I/O request using the correct subchannel set designation.

Within exemplary embodiments, the designation of the PPRC secondary device as residing within a subchannel set differing from subchannel set zero would require that the PPRC secondary device be defined as a special device (in this instance 3390D of the PPRC secondary device definition 120) which would indicate that the PPRC secondary device definition presently resides within SS1 110. Further, the definition of the devices (i.e., the operating system data structure that represents the device, the unit control block (UCB)) would associate the PPRC primary device number with the PPRC secondary device number. Within exemplary embodiments this associative relationship is implemented not only by defining the PPRC secondary device with a special device attribute (3390D of PPRC secondary device definition 120) but also by defining the PPRC secondary device with a duplicate device number of the PPRC primary device—except that in this instance the device number would reside in SS1 110.

As shown in FIG. 3, the PPRC primary device definition 220 address is 00414, with the first digit of the device number, zero, representing a location in the subchannel set zero, while the PPRC secondary device definition 215 address is 10414 with the first digit of the device number, one, representing a location in subchannel set one. Each of these device numbers is pointed to by a device number lookup table called the UCB Lookup Table (ULUT) 210 or 205 respectively. The ULUTs 210 and 205 are implemented in the event that a lookup service is being utilized to obtain the address of a device's UCB 220, 215 in order to perform I/O related functions.

Within exemplary embodiments of the present invention in order to establish PPRC device pairings, perform device interrogates, break apart PPRC device pairs, or re-synchronize PPRC device pairs, etc., OS functions that perform these tasks using device numbers expand their device number representations to include both the device number of the PPRC device and the subchannel set in which the PPRC device resides. PPRC functions can implement conventional UCB lookup services (e.g., such as UCBLOOK and UCBSCAN) in order to utilize the new device number and subchannel set indications. Further, the I/O requests issued to the PPRC devices and control units to perform various tasks would use the UCB addresses found using specific subchannel sets.

Application I/O requests for the PPRC primary device will continue without change to utilize the UCB address 220 of the control block representing the PPRC primary device that is connected to the subchannel residing within subchannel set zero 105. Applications obtain the device address information (UCB address) using services that are currently provided to the application (i.e., lookup services such as UCBLOOK and UCBSCAN). Since the applications have made no changes, these services can rapidly obtain the addressing information for the PPRC primary device.

The present exemplary embodiment further provides a solution for the occurrence of a control unit failure in which the PPRC secondary device is required to assume the operations of the PPRC primary device in such a way that application I/O can proceed without interruption. In this instance a PPRC device definition 115, 120 swap 235 is implemented either via command or programmatically to stop using the failing PPRC primary device and begin using the PPRC secondary device. When this occurs, in order to prevent application I/O from having any awareness of the change in PPRC devices, the physical information is swapped between the UCB definitions 220, 215 of the PPRC primary and secondary devices. This way, the UCB addresses remain the same for the application, but the physical PPRC devices are now reversed. Further, the subchannel information blocks 230, 225 are reversed as well and the corresponding ULUT 210, 205 entries in both subchannel sets 105, 110 are marked with a set bit as swapped. This bit setting operation allows special lookup options as required by PPRC management functions in the UCBLOOK and UCBSCAN services to correctly return a required UCB address. This operation is transparent to the application I/O since these applications use lookup services that are not special requests for devices within different subchannel sets.

Once the tailing control unit is recovered, a system user may choose to re-establish the original PPRC pairing using the repaired device as the primary device of the PPRC pair. The user will invoke the PPRC management component which then issues the UCB lookup services in order to obtain the current UCB addresses of the PPRC devices and based on the swap bits 235 that have been set in the ULUT, will obtain the correct UCB address for the current active device as well as the repaired device. As a result, subsequent OS I/O requests will be directed to the correct physical device and not be dependent on maintaining an awareness of the current subchannel set within its control block structures.

Once the PPRC device pairs are re-established, the user may initiate the swap process again in order to reverse the PPRC primary device back to the repaired device, thus swapping the physical characteristics of the PPRC primary devices and PPRC secondary devices and reversing the subchannel set identification back to its original state. Upon the completion of this operation the ULUT 210, 205 swap bits are reset and any special requests will be now directed to the original UCB addresses (220, 215) within the original subchannel set.

A further exemplary embodiment of the present invention provides a mechanism for the movement of a PPRC secondary device definition residing in a subchannel set other than zero (e.g., subchannel set one, two, three, etc.) to subchannel set zero in order to allow application I/O to access the PPRC secondary device definitions in the event of a control unit failure occurrence in which the PPRC secondary device needs to become the PPRC primary device so that application I/O can proceed without interruption. In this instance dynamic I/O reconfiguration is implemented to move the secondary device definitions from subchannel set other than zero to subchannel set zero.

As shown in FIGS. 4 and 5, dynamic I/O reconfiguration (dynamic activate) involves the saving of the PPRC primary device definitions 115 and the PPRC secondary device definitions 120 from their respective subchannel sets (SS0 105 and SS2 140) and deleting the original PPRC primary and secondary device definitions 115, 120 from the subchannel sets (SS0 105 and SS2 140) where the device definitions originally resided via a dynamic activate operation. Then further, adding back via another dynamic activate operation the PPRC primary device definitions 115 to the Subchannel set wherein the PPRC secondary device definition 120 resides (SS2 140) and copying the PPRC secondary device definitions 120 to the subchannel set wherein, the PPRC primary device definitions 115 reside (SS0 105).

Within exemplary embodiments of the present invention the PPRC device numbers will not be swapped since the device numbers within any subchannel set other than zero are not accessible via the normal set of commands (e.g., device displays and configuration type commands such as vary device and vary path as well as allocation processing, etc.). Further, the UCB for each device definition will not be deleted, but rather, will continue to reside at their respective addresses. At the end of this process, the former PPRC primary device definitions 115 will reside in SS2 140 while the former PPRC secondary device definitions will reside in SS0 105. This aspect allows the OS I/O supervisor to continue to drive all base application I/O to only those devices residing in SS0 105 using the UCB control block at the same address in storage, and further, this allows all device dependent information related to the status of the PPRC device pair to be properly exchanged and maintained.

FIG. 6 shows a flow diagram illustrating an exemplary method for swapping peer-to-peer remote copy (PPRC) device definitions between a subchannel set other than zero and subchannel set zero. At step 605 one or more PPRC primary and secondary device pairs are identified for purposes of a subchannel set swap operation, wherein the PPRC primary device definitions reside at subchannel set zero and the PPRC secondary device definitions reside at a subchannel set n—wherein subchannel set n is a subchannel set other than subchannel set zero. At step 610 the control block information for each PPRC device whose device definition is to be swapped is stored.

At steps 615 and 620 the original PPRC primary and secondary device definitions are deleted from the subchannel sets in which the device definitions originally resided. At steps 625 and 630 the PPRC primary device definitions are added via a dynamic activate operation to the subchannel set n where the PPRC secondary device definitions originally resided and the PPRC secondary device definitions are added via dynamic activate to the subchannel set zero where the PPRC primary device definitions originally resided. Lastly, at step 635, the application I/O continues to be driven to PPRC secondary devices that currently reside within subchannel set zero.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for swapping a peer-to-peer remote copy (PPRC) secondary device definition from a subchannel set other than zero to subchannel set zero, the method comprising:
   identifying a PPRC primary device having a corresponding PPRC primary device definition and which is configured to be accessed by application input/output (I/O), and a PPRC secondary device having a corresponding PPRC secondary device definition, which is configured not to be accessed by the application I/O, wherein the PPRC primary device definition resides at subchannel set zero and the PPRC secondary device definition resides at a subchannel set other than subchannel set zero;
   initiating a PPRC device definition substitution operation to substitute the PPRC primary device definition within the subchannel set where the PPRC secondary device definition resides and substitute the PPRC secondary device definition within the subchannel set where the PPRC primary device definition resides; and
   storing the PPRC primary device definition within the subchannel set where the PPRC secondary device definition resides and storing the PPRC secondary device definition within subchannel set zero, including adding back the PPRC primary device definition to the subchannel set where the PPRC secondary device definition resides via a dynamic activate operation, in which the PPRC secondary device assumes operations of the PPRC primary device so that the application I/O proceeds without interruption and in which the application I/O is driven to the PPRC secondary device definition that currently resides within the subchannel set zero.

2. The method of claim 1, further comprising storing control block information for each PPRC device whose device definition is to be substituted.

3. The method of claim 1, wherein storing the PPRC primary device definition within the subchannel set where the PPRC secondary device definition resides and storing the PPRC secondary device definition within subchannel set zero comprises copying each respective PPRC device definition from the subchannel set where the PPRC device definition resides.

4. The method of claim 3, wherein storing the PPRC primary device definition within the subchannel set where the PPRC secondary device definition resides and storing the PPRC secondary device definition within subchannel set zero further comprises deleting the PPRC primary device definition from subchannel set zero and deleting the PPRC secondary device definition from the subchannel set where the secondary device definition originally resided.

5. The method of claim 1, wherein device numbers for the PPRC primary device definition and the PPRC secondary device definition are not copied to new subchannel sets within which the PPRC device definitions are stored.

6. A computer program product that includes a computer readable medium useable by a processor, the medium having stored thereon a sequence of instructions which, when executed by the processor, causes the processor to swap peer-to-peer remote copy (PPRC) secondary device definitions from a subchannel set other than zero to subchannel set zero, by:
   identifying a PPRC primary device having a corresponding PPRC primary device definition and which is configured to be accessed by application input/output (I/O), and a PPRC secondary device having a corresponding PPRC secondary device definition, which is configured not to be accessed by the application I/O, wherein the PPRC primary device definition resides at subchannel set zero and the PPRC secondary device definition resides at a subchannel set other than subchannel set zero;

initiating a PPRC device definition substitution operation to substitute the PPRC primary device definition within the subchannel set where the PPRC secondary device definition resides and substitute the PPRC secondary device definition within the subchannel set where the PPRC primary device definition resides; and storing the PPRC primary device definition within the subchannel set where the PPRC secondary device definition resides and storing the PPRC secondary device definition within subchannel set zero, including adding back the PPRC primary device definition to the subchannel set where the PPRC secondary device definition resides via a dynamic activate operation, in which the PPRC secondary device assumes operations of the PPRC primary device so that the application I/O proceeds without interruption and in which the application I/O is to driven to the PPRC secondary device definition that currently resides within the subchannel set zero.

7. The computer program product of claim 6, further comprising storing control block information for each PPRC device whose device definition is to be substituted.

8. The method of claim 6, wherein storing the PPRC primary device definition within the subchannel set where the PPRC secondary device definition resides and storing the PPRC secondary device definition within subchannel set zero comprises copying each respective PPRC device definition from the subchannel set where the PPRC device definition resides.

9. The method of claim 8, wherein storing the PPRC primary device definition within the subchannel set where the PPRC secondary device definition resides and storing the PPRC secondary device definition within subchannel set zero further comprises deleting the PPRC primary device definition from subchannel set zero and deleting the PPRC secondary device definition from the subchannel set where the secondary device definition originally resided.

10. The method of claim 6, wherein device numbers for the PPRC primary device definition and the PPRC secondary device definition are not copied to the new subchannel sets within which the PPRC device definitions are stored.

* * * * *